(12) United States Patent
Sakurai

(10) Patent No.: US 9,891,655 B2
(45) Date of Patent: Feb. 13, 2018

(54) PARALLEL OPERATION SYSTEM, APPARATUS AND MEDIUM

(71) Applicant: FUJITSU LIMITED, Kawasaki-shi, Kanagawa (JP)

(72) Inventor: Ryota Sakurai, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 14/956,945

(22) Filed: Dec. 2, 2015

(65) Prior Publication Data

US 2016/0161981 A1 Jun. 9, 2016

(30) Foreign Application Priority Data

Dec. 5, 2014 (JP) .................................. 2014-247478

(51) Int. Cl.
*G06F 1/12* (2006.01)
*G06F 9/52* (2006.01)
*G06F 15/173* (2006.01)

(52) U.S. Cl.
CPC .................. *G06F 1/12* (2013.01); *G06F 9/52* (2013.01); *G06F 15/17325* (2013.01)

(58) Field of Classification Search
CPC ........ G06F 9/3891; G06F 9/3885; G06F 9/52; G06F 9/54; G06F 15/17325; G06F 15/163; G06F 15/167; G06F 15/17
See application file for complete search history.

(56) References Cited

U.S. PATENT DOCUMENTS

| 6,466,988 | B1 | 10/2002 | Sukegawa et al. |
| 2005/0050374 | A1 | 3/2005 | Nakamura et al. |
| 2007/0255929 | A1 | 11/2007 | Kasahara et al. |
| 2012/0179896 | A1* | 7/2012 | Salapura ............. G06F 9/30087 712/203 |
| 2013/0290967 | A1* | 10/2013 | Calciu ..................... G06F 9/526 718/102 |

FOREIGN PATENT DOCUMENTS

| JP | 2000-194680 | 7/2000 |
| JP | 2005-71109 | 3/2005 |
| JP | 2006-293768 | 10/2006 |
| JP | 2007-108838 | 4/2007 |
| JP | 2010-191506 | 9/2010 |

* cited by examiner

*Primary Examiner* — Benjamim P Geib
(74) *Attorney, Agent, or Firm* — Staas & Halsey LLP

(57) ABSTRACT

A parallel operation system includes a first node including a first processor configured to execute a first process, a second processor configured to execute a second process, and a first memory, and a second node including a third processor configured to execute a third process, a fourth processor configured to execute a fourth process, and a second memory, and a first signal line that transfers synchronization information between at least one of the first and second processors and at least one of the third and fourth processors, wherein when the first process is to be synchronized with the third process, at least one of the first and the third processors using the first signal line to execute a first synchronization process.

14 Claims, 16 Drawing Sheets

FIG. 6

```
/*PARAMETER TO VARY*/
loop: TOTAL NUMBER OF LOOPS
chunk: CHUNK SIZE
threads: NUMBER OF THREADS omp_set_num_threads(threads);
start = clock();
#pragma omp parallel
{
#pragma omp for ordered schedule(static,chunk)
for(i = 0; i < loop; i++){
  #pragma omp ordered
  {}
 }
}
exetime = clock() - start;
```
601

FIG. 7

| chunk | loop/2 | loop/4 | loop/8 | ... | 1 |
|---|---|---|---|---|---|
| loop | 100 | 1,000 | 10,000 | 50,000 | 100,000 |
| threads | 2 | 3 | 4 | ... | NUMBER OF CORES IN NUMA NODE |

PARAMETER

FIG. 8

| | 1 (chunk) | 2 | 4 | 8 | ... |
|---|---|---|---|---|---|
| 801-1 ⟶ 100 (loop) | C | C | C | 8 | ... |
| 801-2 ⟶ 1,000 | C | C | C | M | ... |
| 801-3 ⟶ 10,000 | C | C | C | M | ... |
| 801-4 ⟶ 50,000 | C | C | M | M | ... |
| 801-5 ⟶ 100,000 | C | C | M | M | ... |

SYNCHRONIZATION-METHOD-SPECIFIC PERFORMANCE INFORMATION / 510

FIG. 9

```
/* chunk = 25, loop = 200, threads = 4 */ pragma omp for ordered schedule(static, chunk)
for(i = 0; i < loop; i++){
 #pragma omp ordered
 {
 printf("i = %d", i);
 }
}
```

PARALLEL OPERATION SYSTEM, APPARATUS AND MEDIUM

CROSS-REFERENCE TO RELATED APPLICATION

This application is based upon and claims the benefit of priority of the prior Japanese Patent Application No. 2014-247478, filed on Dec. 5, 2014, the entire contents of which are incorporated herein by reference.

FIELD

The embodiment discussed herein is related to a parallel operation system, an apparatus and a medium.

BACKGROUND

There is a conventional technique so-called non-uniform memory access (NUMA) that configures such a system that nodes are provided, each of the nodes has a processor and a memory, and the memory is shared between the nodes.

As a related conventional technique, for example, there is a technique of automatically extracting tasks having parallelism from an input program to be processed by a compiler, and arranging the tasks according to characteristics of processor units, in a multiprocessor system. There is also a technique of setting an arrangement having preceding reference data dependency to a work variable, generating a loop, and, after the loop, calculating an execution sentence of the loop where the arrangement having the data dependency is replaced with the work variable. There is also a technique of outputting a transaction for synchronization, after all the transactions of preceding instructions are outputted, to a main memory that serializes memory accesses by the transaction, and to a coherence unit that guarantees completion of cache coherence control by the transaction. There is also a technique of performing a barrier synchronization process, by allocating a synchronization flag area of each processor on a shared memory, updating the synchronization flag area with software in accordance with an execution condition, and causing each processor to compare the synchronization flag areas of other processors taking part in the barrier synchronization with each other. There is also a technique of generating an object code executable on a shared memory type computer with a thread as a unit of parallel processing, by using an intra-thread synchronization overhead information file and a number-of-machine-cycles acquisition library.

Known examples of the conventional techniques include Japanese Laid-open Patent Publication Nos. 2006-293768, 2010-191506, 2000-194680, 2005-71109, and 2007-108838.

SUMMARY

According to an aspect of the invention, a parallel operation system includes: a first node including a first processor configured to execute a first process, a second processor configured to execute a second process, and a first memory; and a second node including a third processor configured to execute a third process, a fourth processor configured to execute a fourth process, and a second memory; and a first signal line that transfers synchronization information between at least one of the first and second processors and at least one of the third and fourth processors, wherein when the first process is to be synchronized with the third process, at least one of the first and the third processors using the first signal line to execute a first synchronization process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram illustrating an example of a performance measurement program;

FIG. 7 is an explanatory diagram illustrating an example of a parameter pattern in the performance measurement program;

FIG. 8 is an explanatory diagram illustrating an example of synchronization-method-specific performance information;

FIG. 9 is an explanatory diagram illustrating an example of a program including a dependency loop;

DESCRIPTION OF EMBODIMENT

According to conventional techniques, when processes executed by the respective processors belonging to different nodes synchronize on a system to which NUMA is applied, processing performance of the system deteriorates, as compared with a case where processes executed by the respective processors belonging to the same node synchronize.

In one aspect, the embodiment is intended to improve processing performance of a system when processes executed by respective processors included in the system synchronize.

The embodiment will be described in detail below, with reference to the drawings.

Figure 1:
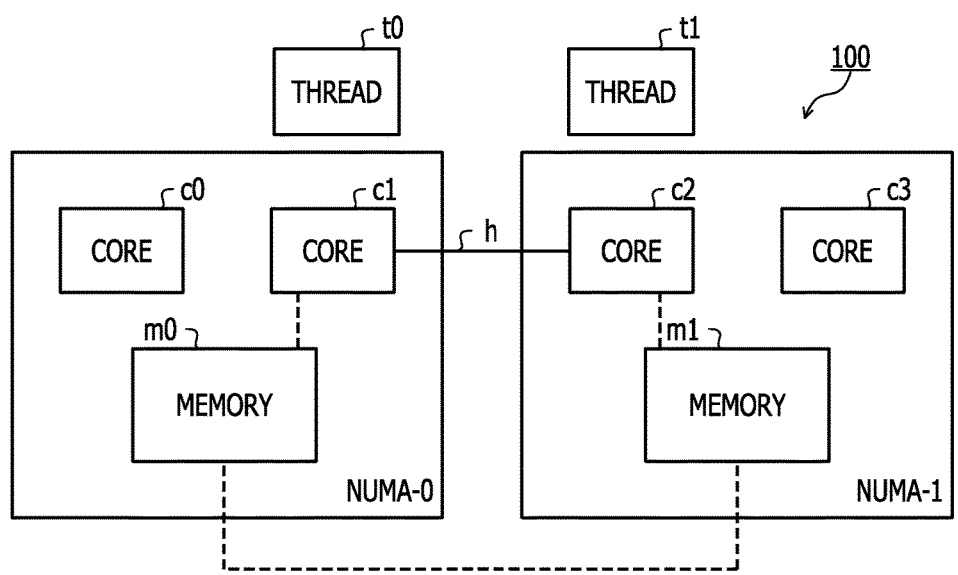
FIG. 1 is an explanatory diagram illustrating an operation example of a parallel operation system according to the embodiment.

FIG. 1 is an explanatory diagram illustrating an operation example of a parallel operation system 100 according to the embodiment. The parallel operation system 100 is a system to which NUMA is applied. Specifically, the parallel operation system 100 illustrated in FIG. 1 has two nodes. Each of the nodes included in the parallel operation system 100 will be hereinafter referred to as "NUMA node". Further, the two nodes will be referred to as "NUMA-0 node" and "NUMA-1 node", respectively.

The NUMA node has processors and a memory. Here, as the processors, a multi-core processor having one central processing unit (CPU) with processor cores may be used, or single processors may be used. The processors may each be hereinafter merely referred to as "core". The NUMA-0 node has a core c0, a core c1, and a memory m0. The NUMA-1 node has a core c2, a core c3, and a memory m1. The number of cores included in the NUMA node may be two or more, and the numbers of cores included in the NUMA nodes may be different. Further, the number of memories included in the NUMA node may be two or more, or the numbers of memories included in the NUMA nodes may be different.

Here, there is a case where processes executed by the respective cores included in the parallel operation system 100 synchronize. The case where the processes synchronize is a case where it is desirable to secure the order in which each of the processes is executed. As a specific example of the case where the processes synchronize, there is a dependency loop in thread parallelism. As another example, there is a case where processes perform exclusive control with respect to each other. The following example will be described using the dependency loop in the thread parallelism.

The dependency loop in the thread parallelism is a loop in which there is a dependence relation between processes per loop. Here, the process per loop may be referred to as "iteration". The cores included in the parallel operation system 100 are caused to execute one or more iterations as one thread. As an example of the loop with the dependence relation, there is a case where a result of executing the preceding iteration is used as an input of the next iteration. When the dependence relation is present, it is difficult to execute the preceding iteration and the next iteration in parallel, and therefore, the next iteration is executed after completion of the preceding iteration. For example, in a loop construct of OpenMP, a dependency loop may be generated, when an ordered construct is used.

In addition, the dependency loop in the thread parallelism is implemented by a post process and a wait process, serving as a synchronization process. A core executing the preceding thread performs, upon completion of an iteration managed by the thread being executed, the post process on a core that executes a thread to be executed after the preceding thread. The core that executes the thread to be executed after the preceding thread is in a wait state due to the wait process, and terminates the wait state upon receiving notification provided by the post process.

The post process and the wait process that become the synchronization process will be further described. As each of the post process and the wait process, there is a process using the memory included in the NUMA node. The post process and the wait process each using the memory may be hereinafter referred to collectively as "memory synchronization process". Further, the post process using the memory will be referred to as "memory-synchronization-based post process", and the wait process using the memory will be referred to as "memory-synchronization-based wait process".

For example, the core executing the preceding thread increments a variable "counter" shared between the threads by one, each time one iteration is executed. Here, the variable "counter" is stored in a chunk secured in the memory included in the NUMA node. The core executing the preceding thread updates the value of the variable "counter", each time increment is performed. When the variable "counter" becomes greater than an iteration exit value "end", the core executing the preceding thread ends the execution. The last update of the variable "counter" is the memory-synchronization-based post process.

On the other hand, by referring to the value of the variable "counter", the thread to be executed after the preceding thread waits when the value of the variable "counter" is smaller than an iteration starting value "start" of the own thread, and executes an iteration of the own thread by terminating the waiting when the value of the variable "counter" is greater than "start". Such waiting when the value of the variable "counter" is smaller than "start" and terminating the waiting when the value of the variable "counter" is greater than "start" is the memory-synchronization-based wait process.

Here, when processes executed by the cores belonging to the different NUMA nodes execute the memory synchronization process, the processing performance of the system deteriorates, as compared with a case where processes executed by the cores belonging to the same NUMA node execute the memory synchronization process. In particular, a waiting time may increase in the core executing the preceding thread and the core executing the next thread, as a chunk size used for the memory synchronization process becomes small.

For example, assume that the chunk size is a size that allows storage of only one value of the variable "counter". In this case, the core executing the preceding thread, after writing the value of the variable "counter" once, is allowed to perform rewriting only after the core executing the next thread refers to the value of the variable "counter". In this way, when the size allows storage of only one value of the variable "counter", the core executing the preceding thread is not allowed to write the values of the variable "counter" successively, and thus the waiting time increases.

Therefore, when synchronizing the processes to be executed by the cores provided in the different nodes, the parallel operation system 100 performs a first synchronization process using an exclusive signal line that couples the cores provided in the different nodes. This increases system performance of the parallel operation system 100, further than in performing a second synchronization process using the memory, namely, the above-described memory synchronization process. The synchronization process using the signal line will be described later. In the example illustrated in FIG. 1, when threads t0 and t1 perform the memory synchronization process, data moves as indicated by a broken line in FIG. 1. Therefore, a delay occurs, as compared with the case where the first synchronization process is performed.

Operation of the parallel operation system 100 will be described using FIG. 1. The parallel operation system 100 has a signal line that couples the processors of the respective NUMA nodes. In the example illustrated in FIG. 1, the parallel operation system 100 has a signal line h that couples the core c1 and the core c2. Further, in the example illustrated in FIG. 1, the core c1 serving as a first processor and the core c2 serving as a second processor are assumed to execute the dependence loop in the thread parallelism. The core c1 is assumed to execute the thread t0 as a first process, and the core c2 is assumed to execute the thread t1 as a second process. The thread t0 is assumed to precede the thread t1.

In this way, the core c1 and the core c2 belong to the different NUMA nodes, and therefore, a parallel operation apparatus decides to execute the synchronization process using the signal line h. Here, the parallel operation apparatus making this decision may be configured by treating the core c1 and the memory m0 as a computer system, or may be configured by treating the memory m1 and the core c2 as a computer system, or may be a computer provided outside the parallel operation system 100.

The first synchronization process using the signal line that couples the cores provided in the different nodes also has the post process and the wait process. The parallel operation system 100 may also have a signal line that couples the cores included in each of the nodes, and in this case, may execute a third synchronization process using the signal line that couples the cores included in each of the nodes. The third synchronization process also has the post process and the wait process. The first synchronization process and the third synchronization process will be hereinafter referred to collectively as "CPU synchronization process". The post process using the signal line will be referred to as "CPU-synchronization-based post process", and the wait process using the signal line will be referred to as "CPU-synchronization-based wait process". The CPU synchronization process and the memory synchronization process will be described with reference to FIG. 4, by using examples. The CPU synchronization process and the memory synchronization process will be hereinafter referred to collectively as "synchronization method".

A specific operation example of the CPU synchronization process will be described below. In the CPU synchronization process, a variable shared between the threads is not provided, and each of the threads has a local variable "local_counter". The core c1 executing the preceding thread t0 updates the value of the local variable "local_counter". When the local variable "local_counter" becomes greater than the iteration exit value "end", the core c1 provides notification of a flag indicating completion of the iteration managed by the own thread, via the signal line h. Providing the notification of the flag via the signal line h is the CPU-synchronization-based post process.

On the other hand, the core c2 executing the thread t1 to be executed after the thread t0 waits until receiving the notification of the flag, and executes the iteration of the own thread by terminating the waiting, upon receiving the notification of the flag. Waiting until receiving the notification of the flag and terminating the waiting upon receiving the notification of the flag is the CPU-synchronization-based wait process.

Next, an example in which the parallel operation system 100 is applied to a server system will be described using FIG. 2.

Figure 2:
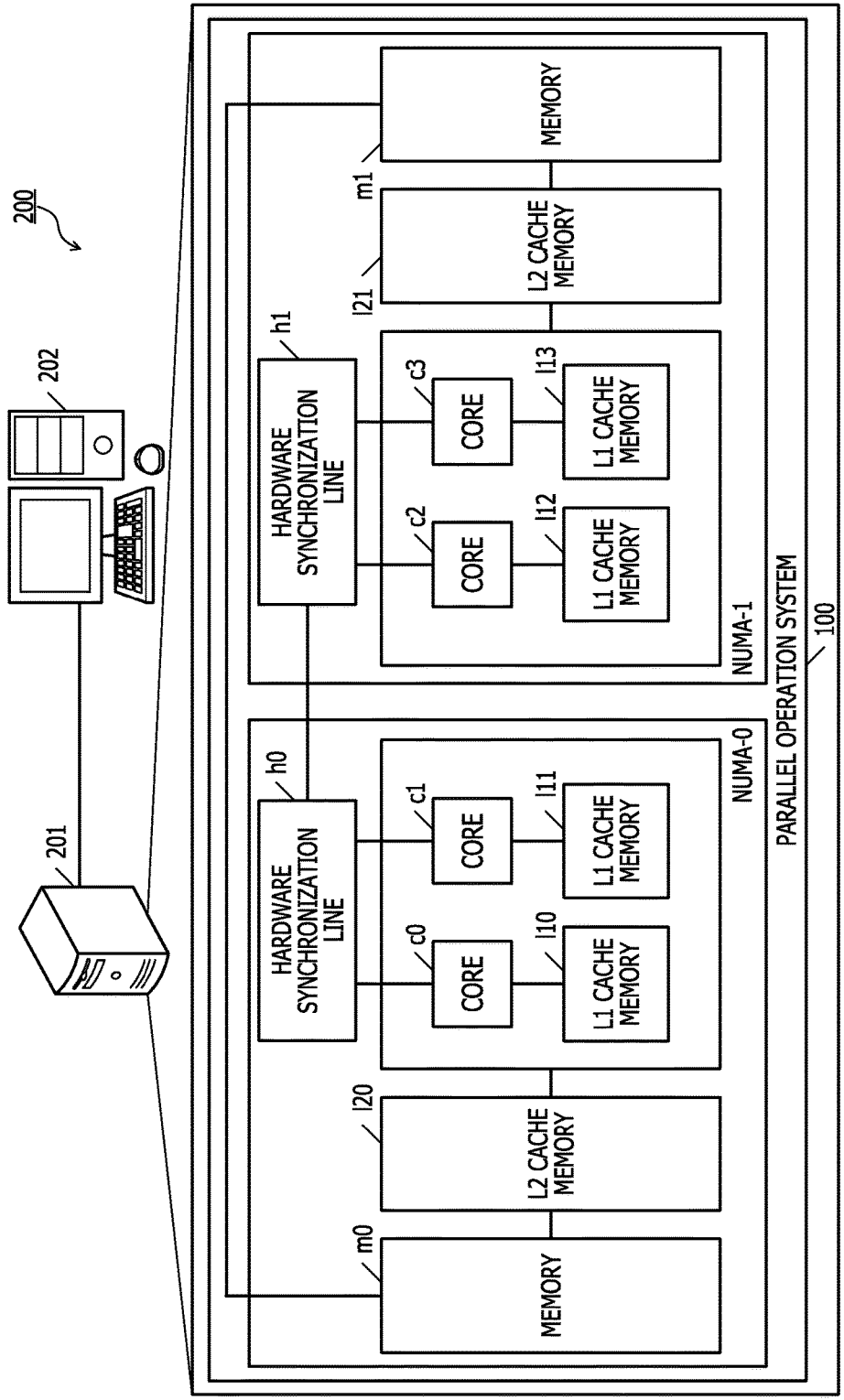
FIG. 2 is an explanatory diagram illustrating a configuration example of a server system.

FIG. 2 is an explanatory diagram illustrating a configuration example of a server system 200. The server system 200 has a server 201 and a login node 202. The server 201 has the parallel operation system 100.

The parallel operation system 100 has the NUMA-0 node and the NUMA-1 node. Here, each hardware synchronization line corresponds to the signal line h illustrated in FIG. 1. Hardware of the NUMA-0 node and hardware of the NUMA-1 node are identical and therefore, only the hardware of the NUMA-0 node will be described below.

The NUMA-0 node has the core c0, the core c1, a L1 cache memory l10, a L1 cache memory l11, a L2 cache memory l20, the memory m0, and a hardware synchronization line h0. The L1 cache memory l10 is a primary cache memory used by the core c0. The L1 cache memory l11 is a primary cache memory used by the core c1. The L2 cache memory l20 is a secondary cache memory used by the core c0 and the core c1.

The hardware synchronization line h0 and a hardware synchronization line h1 may each be a signal line that couples all the cores in the parallel operation system 100, or may be a signal line that couples some of the cores in the parallel operation system 100. As an example of the signal line that couples some of the cores, the parallel operation system 100 may have a signal line between the cores c0 and c1, a signal line between the cores c1 and c2, a signal line between the cores c2 and c3, and a signal line between the cores c3 and c0, so that these signal lines form a ring.

The login node 202 is a computer to be operated by a user who uses the parallel operation system 100. Specifically, the login node 202 transmits a job that performs scientific calculation, to the parallel operation system 100, according to operation of the user.

Figure 3:
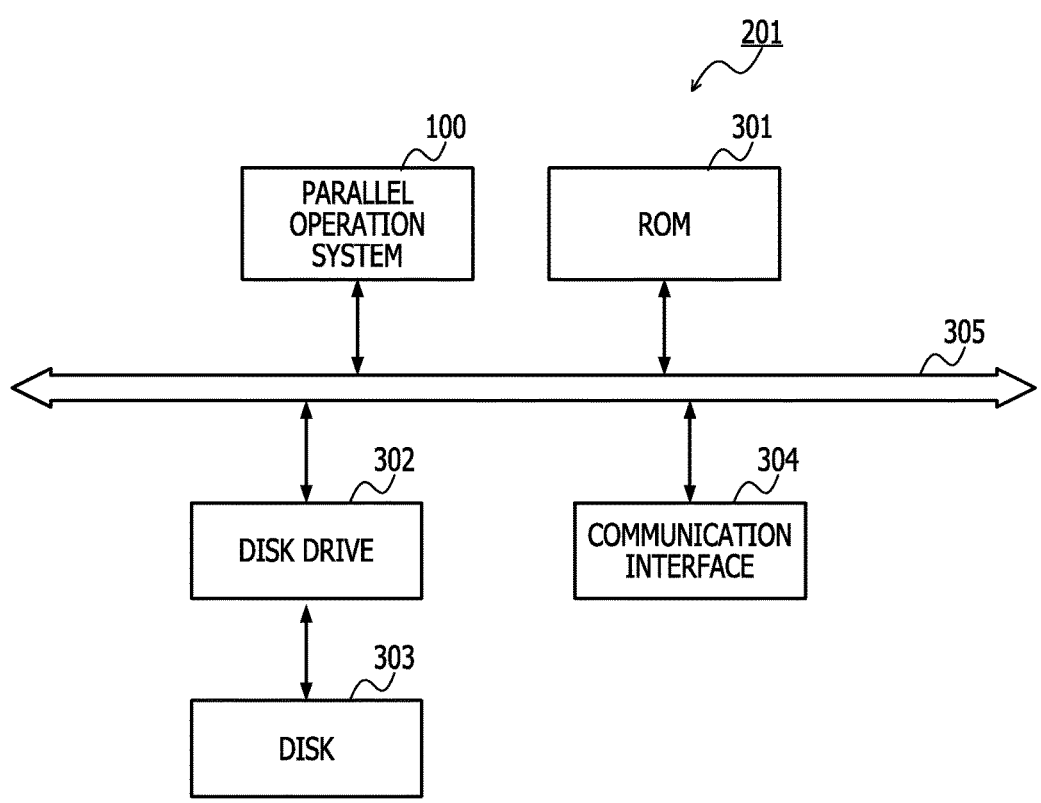
FIG. 3 is an explanatory diagram illustrating a hardware configuration example of a server.

FIG. 3 is an explanatory diagram illustrating a hardware configuration example of the server 201. In FIG. 3, the server 201 includes the parallel operation system 100, a read only memory (ROM) 301, a disk drive 302, a disk 303, and a communication interface 304. Further, the parallel operation system 100, the ROM 301, the disk drive 302, and the communication interface 304 are interconnected by a bus 305.

The parallel operation system 100 is an arithmetic processing unit group that performs overall control of the server 201. The ROM 301 is a nonvolatile memory that stores programs such as a boot program.

The disk drive 302 is a control device that controls reading and writing of data from and to the disk 303 according to control of the parallel operation system 100. For example, a disk drive, a solid state drive, or the like may be adopted for the disk drive 302. The disk 303 is a nonvolatile memory that stores data written by control of the disk drive 302. When the disk drive 302 is, for example, a magnetic disk drive, a magnetic disk may be adopted for the disk 303. When the disk drive 302 is a solid state drive, a semiconductor memory formed of a semiconductor element, a so-called semiconductor disk, may be adopted for the disk 303.

The communication interface 304 is a control device that controls an interface between inside and a network such as a local area network (LAN), a wide area network (WAN), and the Internet, and controls input and output of data to and from other apparatus. Specifically, the communication interface 304 is coupled to the login node 202 or the like via the network. For example, a modem, a LAN adapter, or the like may be adopted for the communication interface 304.

When an operator of the server system 200 directly operates the server 201, the server 201 may have hardware such as a display, a keyboard, and a mouse.

Further, although hardware of the login node 202 is not illustrated in particular, the login node 202 has a CPU, a random access memory (RAM), a ROM, a disk drive, a disk, a communication interface, a display, a keyboard, and a mouse.

Figure 4:
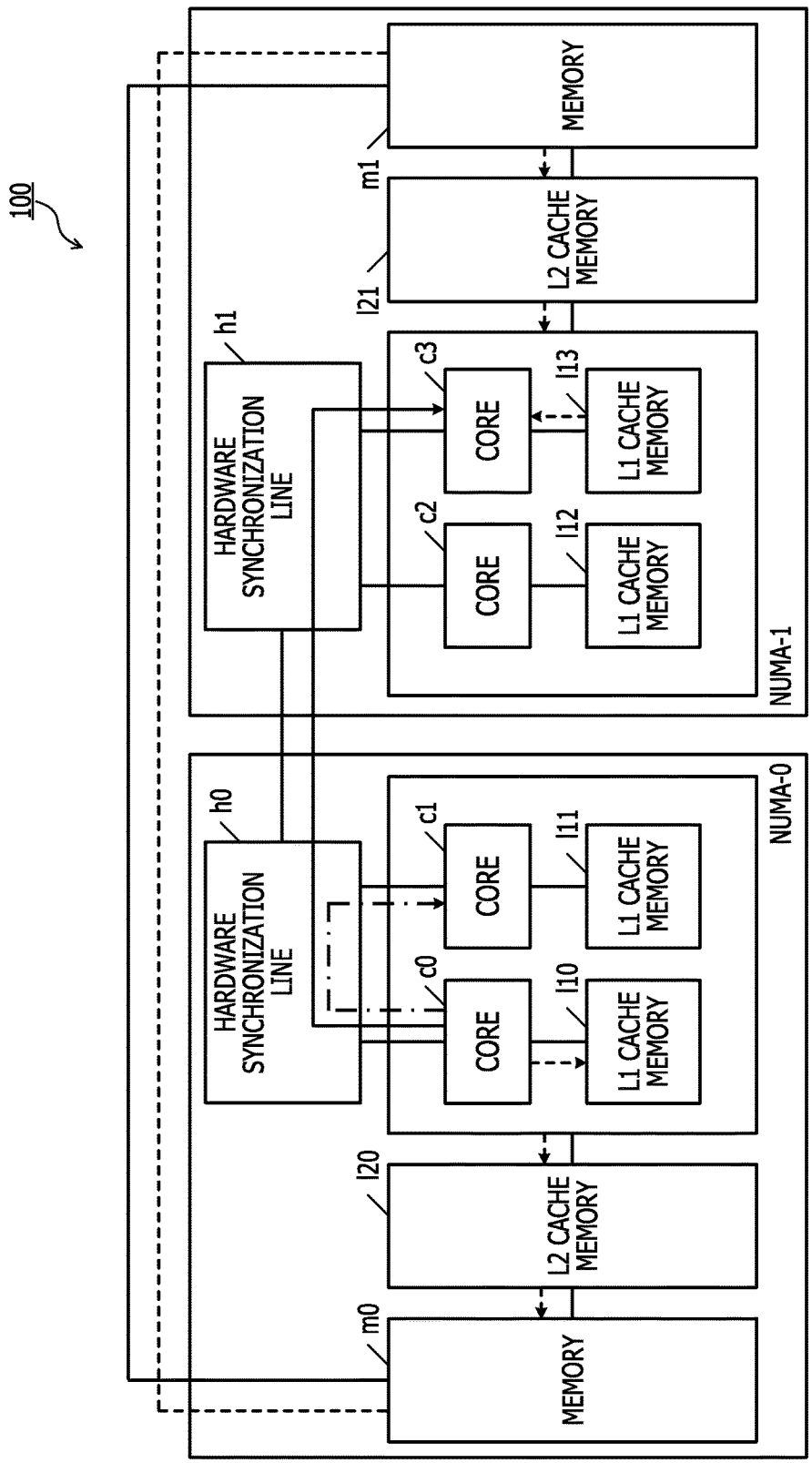
FIG. 4 is an explanatory diagram illustrating examples of a CPU synchronization process and a memory synchronization process.

FIG. 4 is an explanatory diagram illustrating examples of the CPU synchronization process and the memory synchronization process. The examples illustrated in FIG. 4 include an example of each of the CPU synchronization process closed in the NUMA node, the CPU synchronization process involving the NUMA nodes, and the memory synchronization process involving the NUMA nodes.

In FIG. 4, a notification example of the CPU synchronization process closed in the NUMA node is indicated by an arrow of alternate long and short dashed lines. Further, a notification example of the CPU synchronization process involving the NUMA nodes is indicated by an arrow of a solid line. Furthermore, a notification example of the memory synchronization process involving the NUMA nodes is indicated by an arrow of a broken line.

In a comparison between the CPU synchronization process involving the NUMA nodes and the memory synchronization process involving the NUMA nodes, due to a route passing through the memory, the CPU synchronization process involving the NUMA nodes is faster. However, in a comparison between the CPU synchronization process closed in the NUMA node and the memory synchronization process closed in the NUMA node, the memory synchronization process may be faster, when any of the following conditions are satisfied. A first condition is a case where, as for the NUMA-0 node, the L1 cache memories I10 and I11 communicate with the L2 cache memory I20 at a high speed. A second condition is a case where, as for the NUMA-0 node, direct data transmission may be performed between the L1 cache memories I10 and I11. A third condition is a case where the chunk size is large.

Therefore, according to parameters such as the chunk size, characteristics of the memory, and the like, the server 201 decides either the CPU synchronization process or the memory synchronization process to be used as the synchronization method, whichever is faster. How to make this decision will be specifically described using FIG. 5.

(Functional Configuration Example of Server 201)

Figure 5:
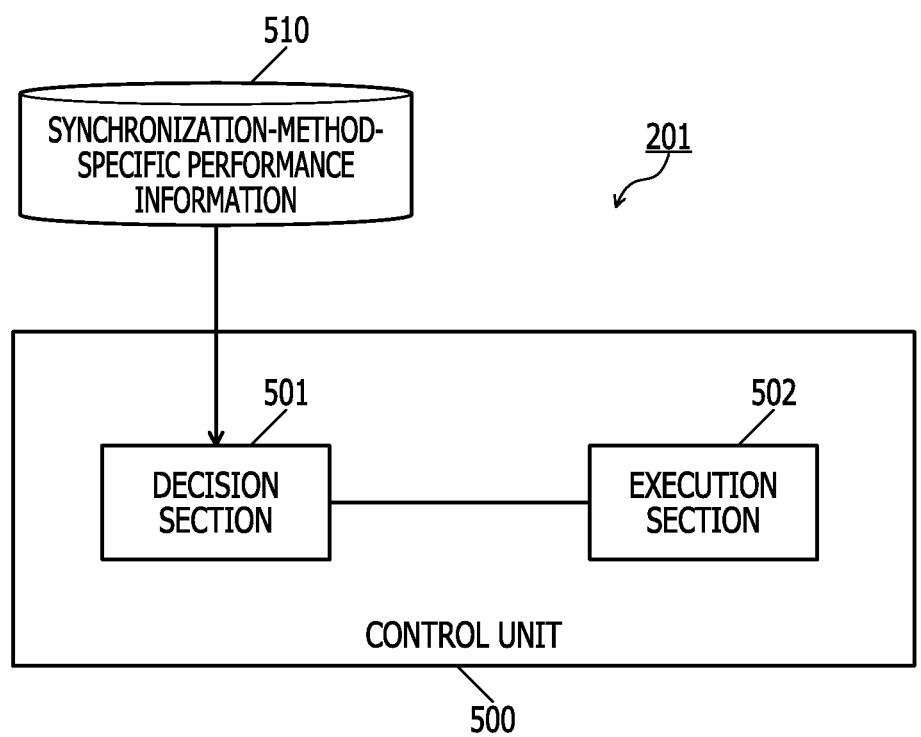
FIG. 5 is a block diagram illustrating a functional configuration example of the server.

FIG. 5 is a block diagram illustrating a functional configuration example of the server 201. The server 201 has a control unit 500. The control unit 500 includes a decision section 501 and an execution section 502. Any of the cores in the parallel operation system 100 may execute a program stored in a storage device, so that the control unit 500 implements a function of each section. The storage device is, specifically, for example, the memory in the parallel operation system 100 illustrated in FIG. 1, any of the ROM 301 and the disk 303 illustrated in FIG. 3, or the like. Further, a processing result of each section is stored in a register of any of the cores in the parallel operation system 100, the cache memory in the parallel operation system 100, or the like.

In addition, the server 201 may access synchronization-method-specific performance information 510. The synchronization-method-specific performance information 510 stores a comparison result between processing performance of the CPU synchronization process and processing performance of the memory synchronization process according to the chunk size secured when the memory synchronization process is performed. Further, the synchronization-method-specific performance information 510 may store a comparison result between processing performance of the CPU synchronization process and processing performance of the memory synchronization process according to the number of times any of processes is repeated. Here, this any of processes may be any kind of process if this process is a process per dependency loop, or may be a process performing nothing. FIG. 6 illustrates a specific example of this any of processes. The number of times this any of processes is repeated may be the number of iterations included in the dependency loop, or may be the number of iterations per thread when the dependence loop is divided into threads. Further, the synchronization-method-specific performance information 510 may store a comparison result between processing performance of the CPU synchronization process and processing performance of the memory synchronization process according to the number of threads into which the dependency loop is divided.

The synchronization-method-specific performance information 510 is stored in the storage device such as the memory in the parallel operation system 100 and the disk 303. An example of storage contents of the synchronization-method-specific performance information 510 will be described with reference to FIG. 8.

The decision section 501 decides to execute the CPU synchronization process, when a first core, and a second core, which executes a second thread synchronizing with a first thread, belong to the different NUMA nodes.

Further, when the first core and the second core belong to the same node, the decision section 501 may decide to execute the memory synchronization process using the memory included in the NUMA node to which the first core and the second core belong.

Assume that the first core and the second core belong to the same node. In this case, the decision section 501 may decide to execute either one of the CPU synchronization process and the memory synchronization process, based on the chunk size to be secured when the memory synchronization process is performed, by referring to the synchronization-method-specific performance information 510.

For example, assume that the comparison result corresponding to the same size as the chunk size to be secured when the memory synchronization process is performed is stored in the synchronization-method-specific performance information 510. In this case, the decision section 501 acquires the comparison result corresponding to the same size as the chunk size to be secured, and decides to execute the synchronization method indicated as a faster one by the acquired comparison result. Further, for example, assume that the comparison result corresponding to the same size as the chunk size to be secured when the memory synchronization process is performed is not stored in the synchronization-method-specific performance information 510. In this case, the decision section 501 acquires, for example, the comparison result corresponding to a size closest to the chunk size to be secured, and decides to execute the synchronization method indicated as a faster one by the acquired comparison result.

Further, assume that the first core and the second core belong to the same node. In this case, the decision section 501 refers to the synchronization-method-specific performance information 510, thereby deciding to execute either one of the CPU synchronization process and the memory synchronization process, based on the number of times the first thread and the second thread repeat a predetermined process. Here, the predetermined process is a part of what is generated from a job transmitted from the login node 202, and corresponds to one iteration. A specific example of the predetermined process is illustrated in FIG. 9. Further, the first thread and the second thread may repeat the predetermined process the same number of times, or may repeat the predetermined process the different numbers of times. The number of times the first thread and the second thread repeat the predetermined process may be the total number of times the first thread and the second thread each repeat the predetermined process, or may be an average thereof.

The execution section 502 executes the synchronization process decided by the decision section 501. For example, assume that the decision section 501 decides to execute the CPU synchronization process, and the core having the execution section 502 executes the post process. In this case, the execution section 502 executes the CPU-synchronization-based post process.

FIG. 6 is an explanatory diagram illustrating an example of a performance measurement program 601. The performance measurement program 601 illustrated in FIG. 6 is a program to be used in generating the synchronizationmethod-specific performance information 510. In the example illustrated in FIG. 6, the dependency loop is a part specified by the next curly braces specified by "#pragma omp ordered".

In the performance measurement program 601, "loop", "chunk", and "threads" indicate the total number of loops, the chunk size, and the number of threads, respectively, and serve as parameters for the performance measurement program 601. A value that may be taken by each of "loop", "chunk", and "threads" will be described with reference to FIG. 7.

FIG. 7 is an explanatory diagram illustrating an example of a parameter pattern in the performance measurement program 601. As illustrated in FIG. 7, the value that may be taken by the parameter "chunk" depends on "loop", and is any of "loop/2", "loop/4", "loop/8", . . . , and 1. Further, the number of values that may be taken by the parameter "chunk" is "floor($\log_2$ loop)". Here, "floor(x)" indicates a maximum integer equal to or smaller than x.

Here, for simplification of the description, a data size to be "chunk=1" in the embodiment is assumed to be a data size to be used when data is exchanged between the two threads per loop. For example, when the value of the counter is exchanged between the two threads, "chunk=1" is a data size that allows the value of the counter to be stored with one loop. Similarly, "chunk=x" is a data size x times greater than the data size that allows the value of the counter to be stored with one loop. Further, an nth chunk is "($1/2$)$^n$×loop", where "($1/2$)$^n$×loop"≥1.

The value that may be taken by the parameter "loop" is any of 100, 1000, 10000, 50000, and 100000. The number of values that may be taken by the parameter "chunk" is 5.

The value that may be taken by the parameter "threads" is any of 2, 3, 4, . . . , and the number of cores in the NUMA node. The number of values that may be taken by the parameter "threads" is "(the number of cores in the NUMA node)−1".

Therefore, the number of times of execution by the performance measurement program 601 is "floor($\log_2$ loop)×5×((the number of cores in NUMA nodes)−1).

FIG. 8 is an explanatory diagram illustrating an example of the synchronization-method-specific performance information 510. The synchronization-method-specific performance information 510 is information indicating which one of the CPU synchronization process and the memory synchronization process is faster, based on each parameter illustrated in FIG. 7. The synchronization-method-specific performance information 510 illustrated in FIG. 8 indicates either the CPU synchronization process or the memory synchronization process whichever is faster, depending on the combination of "chunk" and "loop", in a certain number of "threads". Here, for simplification of the description, "C" illustrated in FIG. 8 is assumed to indicate that the CPU synchronization process is faster, and "M" illustrated in FIG. 8 is assumed to indicate that the memory synchronization process is faster.

The synchronization-method-specific performance information 510 illustrated in FIG. 8 has records 801-1 to 801-5. For example, the record 801-1 indicates either the CPU synchronization process or the memory synchronization process whichever is faster, in each of "chunk"=1, 2, 4, 8, . . . , when "loop"=100.

Next, a decision result in executing the dependency loop of the synchronization method, and execution of the dependence loop according to the decision result will be described with reference to FIGS. 9 to 11, by using an example.

FIG. 9 is an explanatory diagram illustrating an example of a program 901 including the dependency loop. The program 901 represents an example of the dependency loop, which is "chunk"=25, "loop"=200, and "threads"=4. In the program 901, the predetermined process is a part "printf ("i=% d", i);" specified by the next curly braces specified by "#pragma omp ordered".

Further, the two NUMA nodes are assumed to execute the program 901, and the cores c0 and c1 of the NUMA-0 node, and the cores c2 and c3 of the NUMA-1 node are each assumed to execute the threads t0 to t3. Furthermore, the core that executes the thread is assumed to communicate with the core on the right illustrated in FIG. 2. Still further, the core on the right of the core that executes the last thread is assumed to be the core c0. For example, the core c0 that executes the thread t0 communicates with the core c1 that executes the thread t1. Further, the core c3 that executes the thread t3 communicates with the core c0 that executes the thread t0.

It is assumed that, after executing the 0th to 24th dependency loops, the thread t0 provides notification to the thread t1 in the post process, and then enters the wait state by performing the wait process, and subsequently executes the 100th to 124th dependency loops by receiving notification from the thread t3. It is also assumed that, after executing the 25th to 49th dependency loops by receiving notification from the thread t0, the thread t1 provides notification to the thread t2 in the post process, and then enters the wait state by performing the wait process, and subsequently executes the 125th to 149th dependency loops by receiving notification from the thread t0.

It is also assumed that, after executing the 50th to 74th dependency loops by receiving notification from the thread t1, the thread t2 provides notification to the thread t3 in the post process, and then enters the wait state by performing the wait process, and subsequently executes the 150th to 174th dependency loops by receiving notification from the thread t1. It is also assumed that, after executing the 75th to 99th dependency loops by receiving notification from the thread t2, the thread t3 provides notification to the thread t0 in the post process, and then enters the wait state by performing the wait process, and subsequently executes the 175th to 199th dependency loops by receiving notification from the thread t2.

A group of iterations that the thread performs the dependency loop may be hereinafter referred to as "iteration group".

Figure 10:
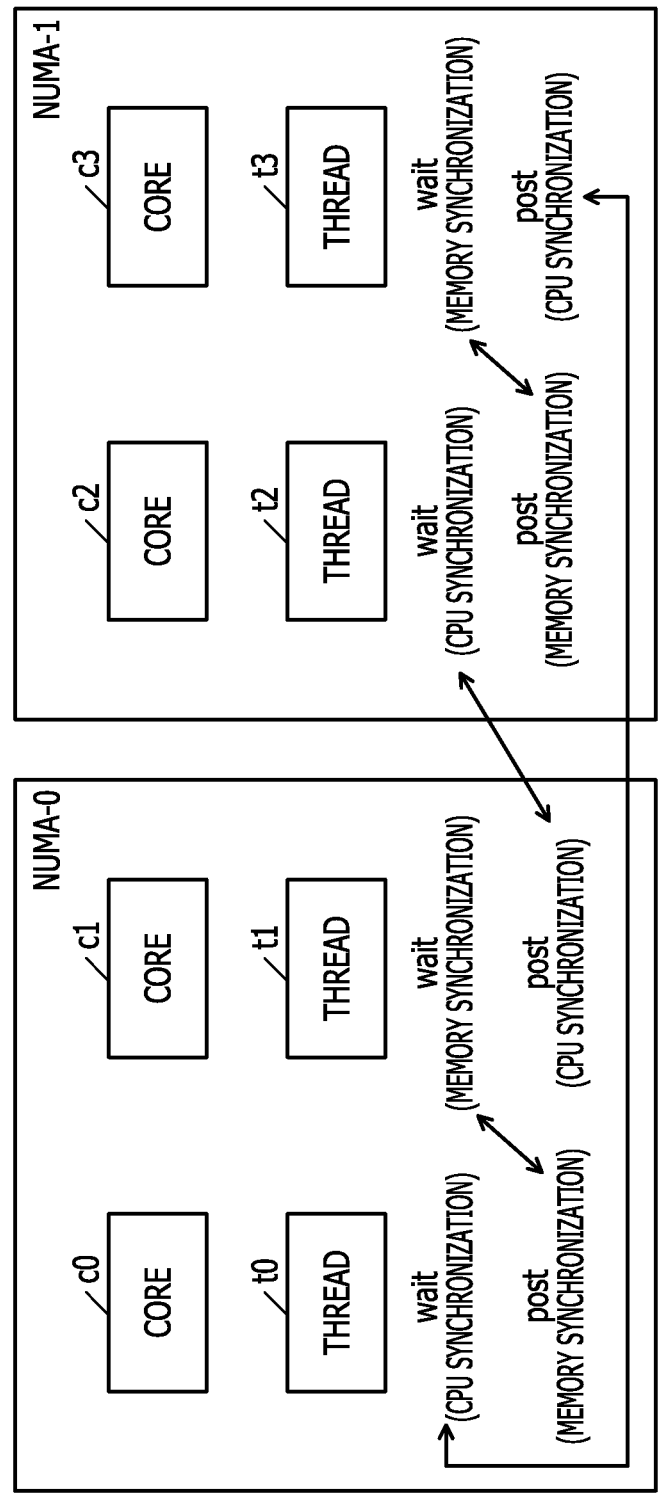
FIG. 10 is an explanatory diagram illustrating an example of a decision result of a synchronization method.

FIG. 10 is an explanatory diagram illustrating an example of the decision result of the synchronization method. The cores c0 to c3 each decide the synchronization method to be performed in the post process, and the synchronization method to be performed in the wait process. In the example illustrated in FIG. 10, the cores c0 to c3 each decide to execute the memory synchronization process when the cores communicating with each other belong to the same NUMA node, and decide to execute the CPU synchronization process when the cores communicating with each other belong to the different NUMA nodes.

As illustrated in FIG. 10, when, for example, the core c0 executes the post process and the core c1 executes the wait process, the core c0 and the core c1 belong to the same NUMA node, and therefore, the core c0 decides to execute the memory synchronization process as the synchronization method. When the core c3 performs the post process and core c0 performs the wait process, the core c3 and the core c0 belong to the different NUMA nodes, and therefore, the core c0 decides to execute the CPU synchronization process as the synchronization method.

In this way, in the thread executed by each core, the synchronization methods may be different. However, as for the cores communicating with each other, the one performing the post process and the other performing the wait process, pieces of information to make the decision are identical and therefore the synchronization methods match with each other.

Figure 11:
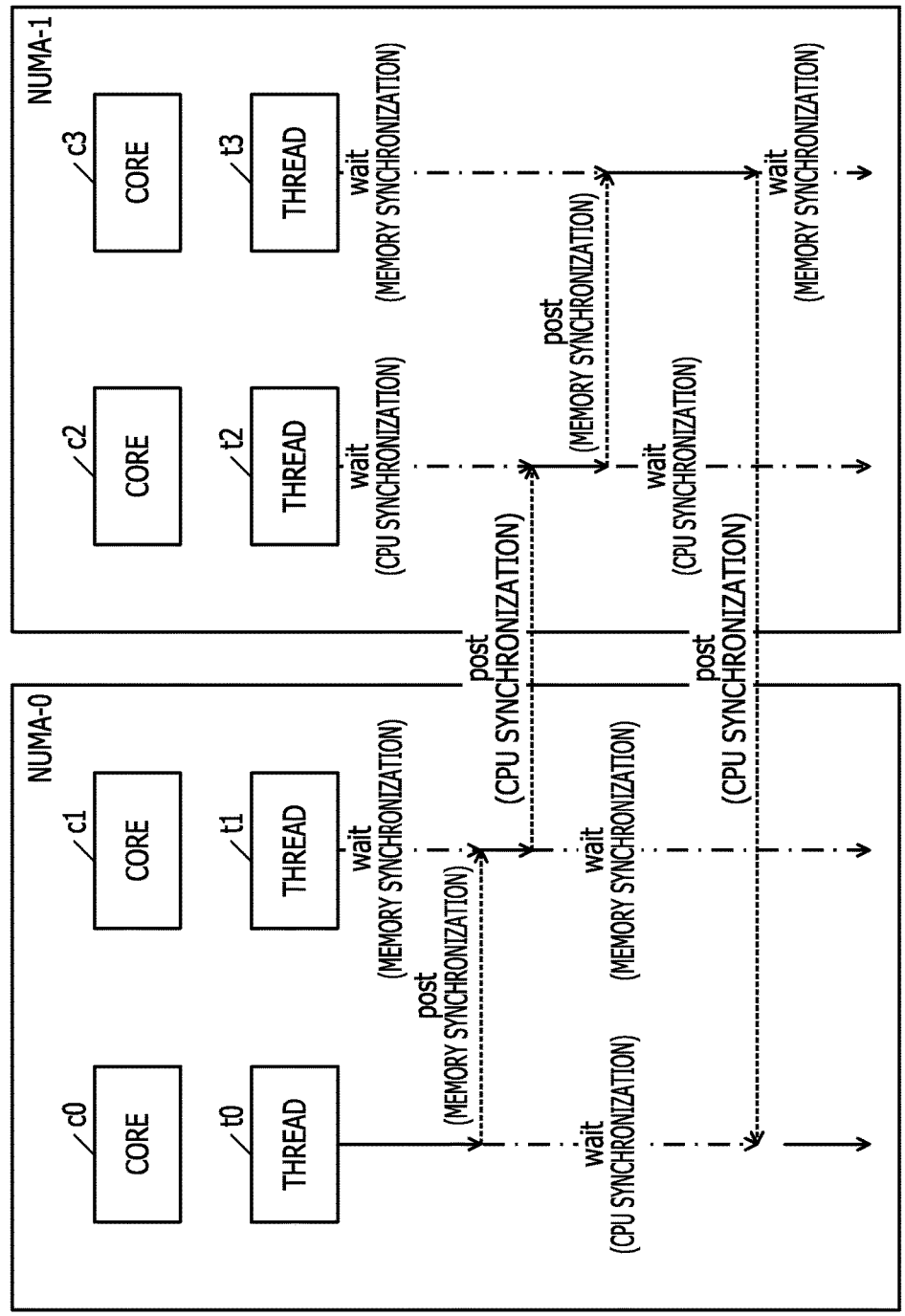
FIG. 11 is an explanatory diagram illustrating an example of a flow of a process including a dependency loop according to a decision result of a synchronization method.

FIG. 11 is an explanatory diagram illustrating an example of a flow of the process including the dependency loop according to the decision result of the synchronization method. In FIG. 11, the notification based on the post process is indicated by a dotted line, and the wait state based on the wait process is indicated by alternate long and short dashed lines.

As illustrated in FIG. 11, the core c0 that executes the thread t0 executes the 0th to 24th dependence loops, and provides notification based on the memory-synchronization-based post process to the core c1 that executes the thread t1, and then enters the wait state by performing the CPU-synchronization-based wait process. The core c0 then executes the 100th to 124th dependency loops by receiving notification based on the CPU-synchronization-based post process from the core c3 that executes the thread t3. The core c1 that executes the thread t1 first enters the wait state by executing the memory-synchronization-based wait process. The core c1 then executes the 25th to 49th dependency loops by receiving notification based on the memory-synchronization-based post process from the core c0, and then provides notification based on the CPU-synchronization-based post process to the core c2 that executes the thread t2, and subsequently enters the wait state by performing the memory-synchronization-based wait process.

The core c2 that executes the thread t2 first enters the wait state by performing the CPU-synchronization-based wait process. The core c2 then executes the 50th to 74th dependency loops by receiving notification based on the CPU-synchronization-based post process from the core c1, and then provides notification based on the memory-synchronization-based post process to the core c3 that executes the thread t3, and subsequently enters the wait state by performing the CPU-synchronization-based wait process. The core c3 that executes the thread t3 first enters the wait state by performing the memory-synchronization-based wait process. The core c3 then executes the 75th to 99th dependency loops by receiving notification based on the memory-synchronization-based post process from the core c2, and then provides notification based on the CPU-synchronization-based post process to the core c0 that executes the thread t0, and subsequently enters the wait state by performing the memory-synchronization-based wait process.

As illustrated in FIG. 11, the cores communicating with each other, the one performing the post process and the other performing the wait process, the synchronization methods match with each other, so that the dependence loop may be correctly executed. Next, processes performed by the server system 200 will be described using a flowchart of each of FIGS. 12, 13, 14, 15, and 16.

Figure 12:
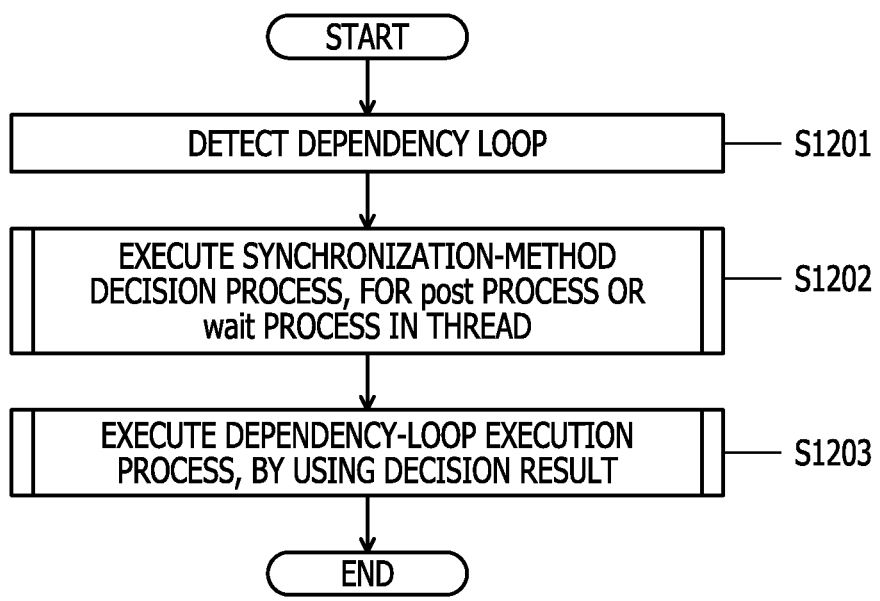
FIG. 12 is a flowchart illustrating an example of a dependency-loop detection process procedure.

FIG. 12 is a flowchart illustrating an example of a dependency-loop detection process procedure. A dependency-loop detection process is executed when the dependency loop is detected. Each core executes the dependency-loop detection process when detecting the dependency loop. The description with reference to FIGS. 12, 13, 14, 15, and 16 will be provided taking the execution by the core c0 as an example.

The core c0 detects the dependency loop in the thread (step S1201). Next, the core c0 executes a synchronization-method decision process, for the post process or the wait process in the thread (step S1202). The synchronization-method decision process will be described with reference to FIG. 13.

The core c0 then executes a dependency-loop execution process by using the decision result (step S1203). The dependency-loop execution process will be described with reference to FIGS. 14, 15, and 16. Upon completion of the process in step S1203, the core c0 ends the dependency-loop detection process. The server system 200 may execute the dependency loop faster, by executing the dependency-loop detection process.

Figure 13:
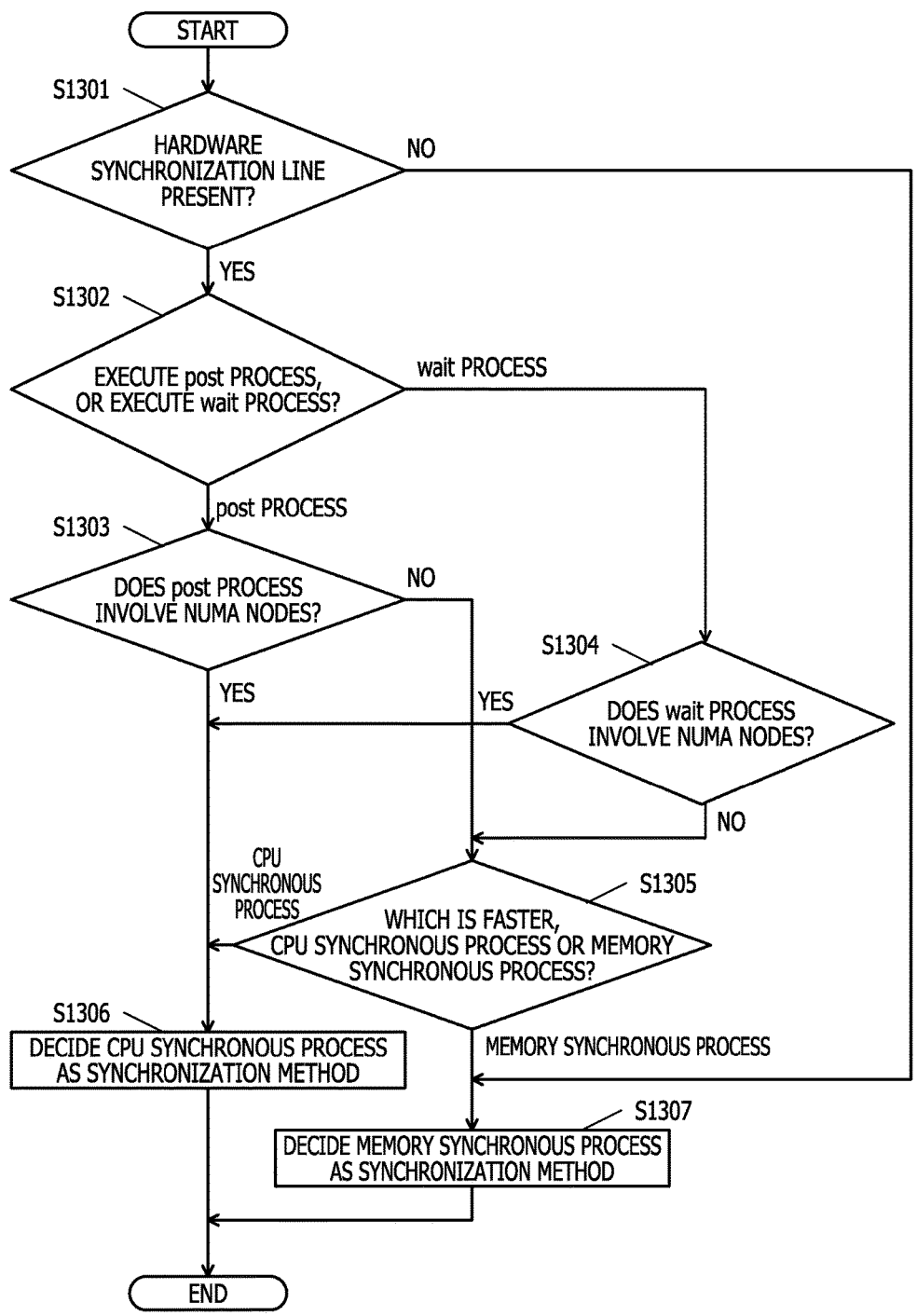
FIG. 13 is a flowchart illustrating an example of a synchronization-method decision process procedure.

FIG. 13 is a flowchart illustrating an example of a synchronization-method decision process procedure. The synchronization-method decision process is a process to decide the synchronization method in executing the post process or the wait process. Here, the core c0 is assumed to know an ID of the core to be a destination of notification, when executing the post process. Similarly, the core c0 is assumed to know an ID of the core to be a sender of notification, when executing the wait process. Further, the synchronization-method decision process is executed by calling a program provided by a library. Furthermore, the above-described library decides the total number of loops, the number of threads, and the chunk size, when the synchronization-method decision process is executed.

The core c0 determines whether the hardware synchronization line is present, for the core to be the destination of the notification when executing the post process, or the core to be the sender of the notification when executing the wait process (step S1301). In step S1301, specifically, an application programming interface (API), which asks the OS whether the hardware synchronization line is present, is described in the program provided by the library. The core c0 determines whether the hardware synchronization line is present, by calling the above-described API.

When the hardware synchronization line is present (step S1301: Yes), the core c0 then determines whether to execute the post process or the wait process (step S1302). When executing the post process (step S1302: post process), the core c0 determines whether the post process involves the NUMA nodes (step S1303). When executing the wait process (step S1302: wait process), the core c0 determines whether the wait process involves the NUMA nodes (step S1304).

When the post process does not involve the NUMA nodes (step S1303: No), or when the wait process does not involve the NUMA nodes (step S1304: No), the core c0 determines which one of the CPU synchronization process and the memory synchronization process is faster (step S1305). Specifically, for example, the core c0 determines which one of the CPU synchronization process and the memory synchronization process is faster, based on the total number of loops, the number of threads, and the chunk size decided by the above-described library, by referring to the synchronization-method-specific performance information 510.

When the post process involves the NUMA nodes (step S1303: Yes), or when the wait process involves the NUMA nodes (step S1304: Yes), or when the CPU synchronization process is faster (step S1305: CPU synchronization process), the core c0 decides the CPU synchronization process as the synchronization method (step S1306). Specifically, the core c0 decides the CPU synchronization process as the synchronization method of the post process when executing the post process, and decides the CPU synchronization process as the synchronization method of the wait process when executing the wait process.

On the other hand, when the memory synchronization process is faster (step S1305: memory synchronization process), or when the hardware synchronization line is not present (step S1301: No), the core c0 decides the memory synchronization process as the synchronization method (step S1307). Specifically, the core c0 decides the memory synchronization process as the synchronization method of the post process when executing the post process, and decides the memory synchronization process as the synchronization method of the wait process when executing the wait process.

Upon completion of the process in step S1306 or step S1307, the core c0 ends the synchronization-method decision process. The core c0 may select either the CPU synchronization process or the memory synchronization process, whichever is faster, as the synchronization method in executing the post process or the wait process, by executing the synchronization-method decision process.

Figure 14:
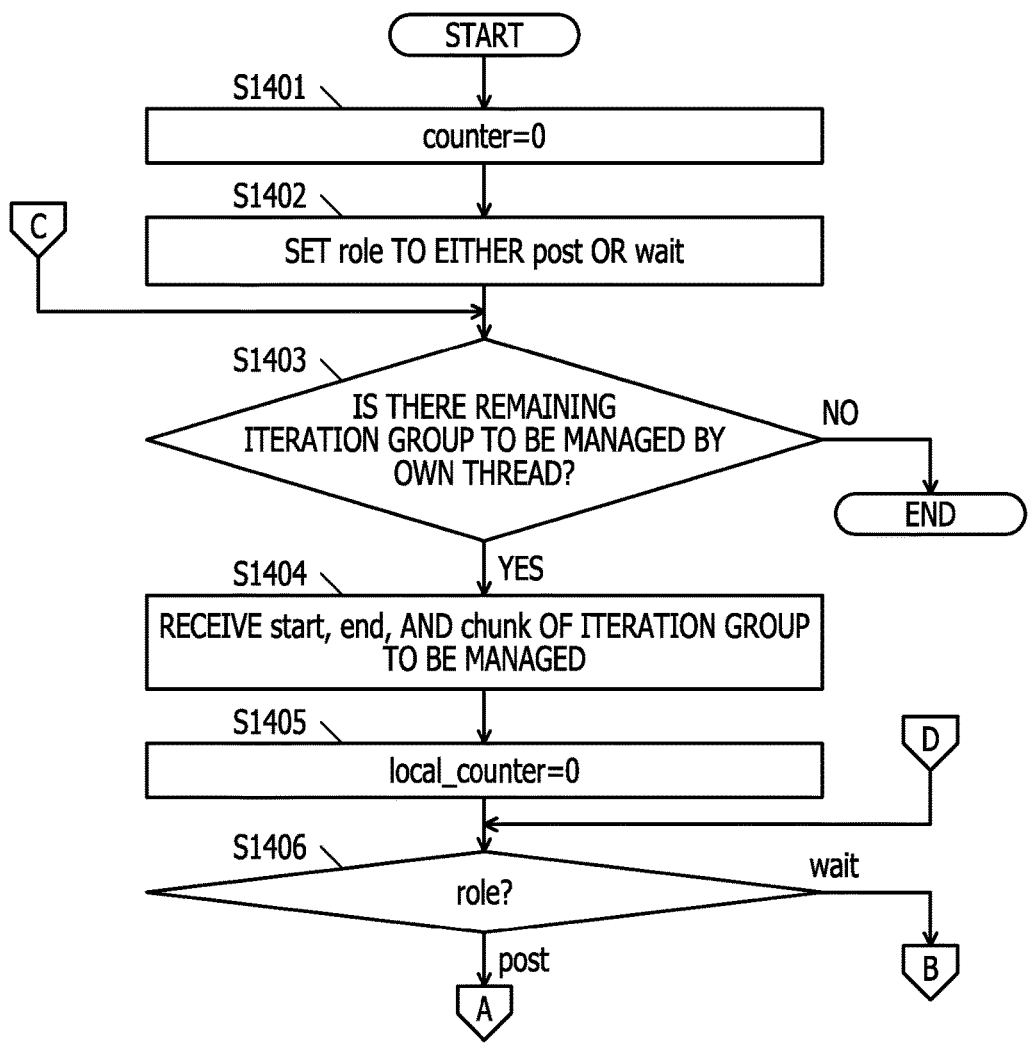
FIGS. 14, 15, and 16 are flowcharts illustrating an example of a dependency-loop execution process procedure.
Figure 15:
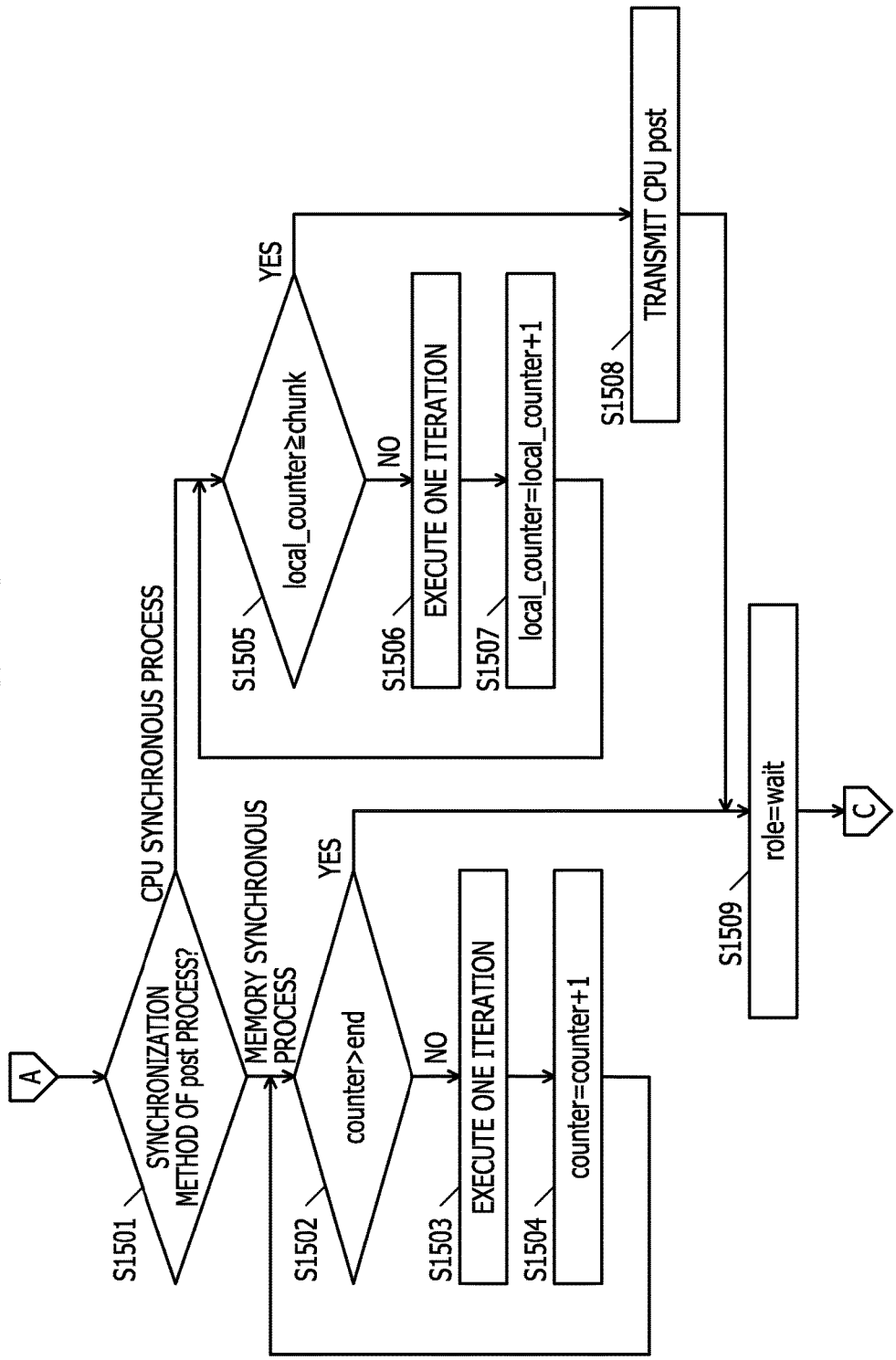
Figure 16:
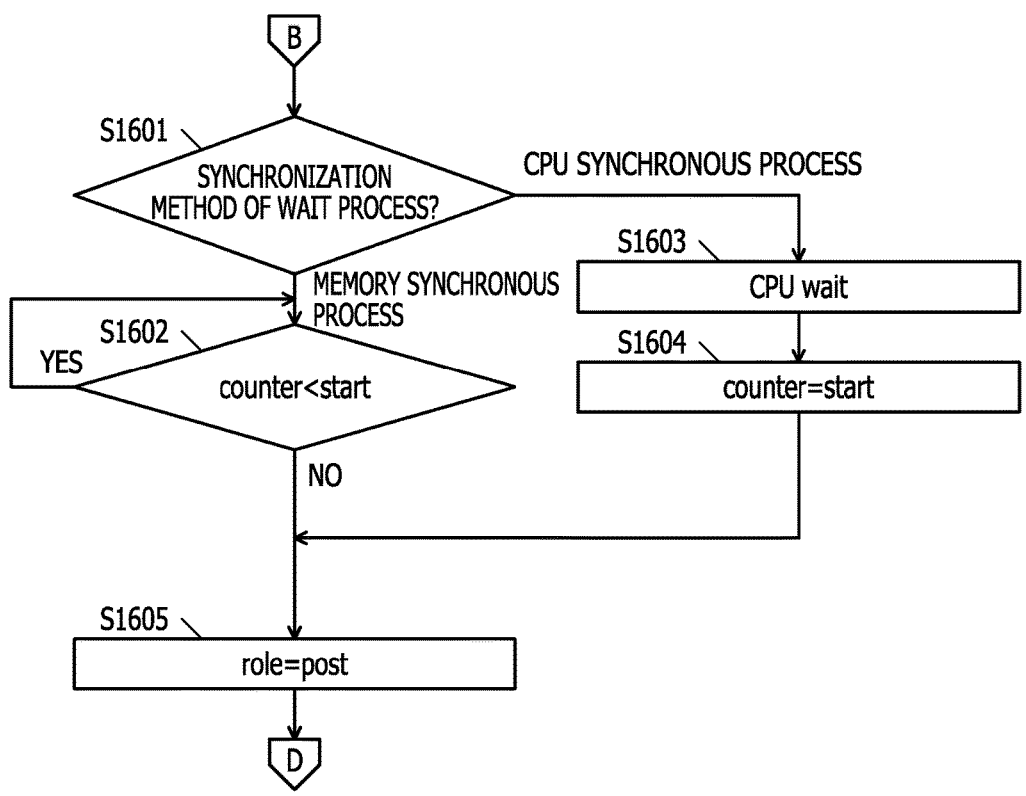

FIGS. 14, 15, and 16 are flowcharts illustrating an example of a dependency-loop execution process procedure. The dependency-loop execution process is a process to execute the dependency loop. FIGS. 14, 15, and 16 are assumed to represent the process in executing the dependence loop illustrated in FIGS. 9, 10, and 11.

Here, the variables to be used in the dependency-loop execution process will be described. The variable "counter" is a variable shared between the threads, and is a counter of a shared variable used in the memory synchronization process. The following variables are local in the thread. The variable "local_counter" is a thread-local counter used in the CPU synchronization process. The value "start" and the value "end" are a starting value and an exit value, respectively, of an iteration managed by the thread. The chunk size managed by the thread is represented by "chunk". An identifier indicating "post" or an identifier indicating "wait" is stored by "role".

The core c0 sets "counter" to 0 (step S1401). Next, the core c0 sets "role" to either "post" or "wait" (step S1402). In step S1402, specifically, the core executing the thread t0 that is a top thread sets "role" to "post", and other cores set "role" to "wait". Therefore, the core c0 sets "role" to "post", to execute the thread t0. Further, the cores c1 to c3 each set "role" to "wait".

Upon completion of the process in step S1402 or completion of a process in step S1509, the core c0 determines whether there is a remaining iteration group to be managed by the own thread (step S1403). When there is no remaining iteration group to be managed by the own thread (step S1403: No), the core c0 ends the dependency-loop execution process.

On the other hand, when there is a remaining iteration group to be managed by the own thread (step S1403: Yes), the core c0 receives "start", "end", and "chunk" of the iteration group to be managed by the core c0 (step S1404). Here, "start", "end", and "chunk" are values decided by the library that provides the program for the synchronization-method decision process. Next, the core c0 sets "local_counter" to 0 (step S1405).

Upon completion of the process in step S1405 or completion of a process in step S1605, the core c0 determines which one of the following identifiers matches with "role" (step S1406). The identifiers are the identifier indicating "post" and the identifier indicating "wait". When "role" is the identifier indicating "post" (step S1406: post), the core c0 determines whether the synchronization method of the post process is the memory synchronization process or the CPU synchronization process (step S1501). Here, the synchronization method of the post process is decided in either step S1306 or step S1307.

When the synchronization method of the post process is the memory synchronization process (step S1501: memory synchronization process), the core c0 determines whether "counter" is greater than "end" (step S1502). When "counter" is equal to or less than "end" (step S1502: No), the core c0 executes one iteration (step S1503). The core c0 then sets "counter" to "counter+1" (step S1504). Upon completion of the process in step S1504, the core c0 shifts to the process in step S1502.

On the other hand, when the synchronization method of the post process is the CPU synchronization process (step S1501: CPU synchronization process), the core c0 determines whether "local_counter" is equal to or greater than "chunk" (step S1505). When "local_counter" is less than "chunk" (step S1505: No), the core c0 executes one iteration (step S1506). Next, the core c0 sets "local_counter" to "local_counter+1" (step S1507). Upon completion of the process in step S1507, the core c0 shifts to the process in step S1505.

On the other hand, when "local_counter" is equal to or greater than "chunk" (step S1505: Yes), the core c0 transmits "CPU post" (step S1508). Upon completion of the process in step S1508, or when "counter" is greater than "end" (step S1502: Yes), the core c0 sets "role" to the identifier indicating "wait" (step S1509). Upon completion of the process in step S1509, the core c0 shifts to the process in step S1403.

When "role" is the identifier indicating "wait" (step S1406: wait), the core c0 determines whether the synchronization method of the wait process is the memory synchronization process or the CPU synchronization process (step S1601). Here, the synchronization method of the wait process is the decision made in either step S1306 or step S1307.

When the synchronization method of the wait process is the memory synchronization process (step S1601: memory synchronization process), the core c0 determines whether "counter" is smaller than "start" (step S1602). When "counter" is smaller than "start" (step S1602: Yes), the core c0 executes the process in step S1602 again.

When the synchronization method of the wait process is the CPU synchronization process (step S1601: CPU synchronization process), the core c0 performs "CPU wait" (step S1603). By performing the process in step S1603, the core c0 waits until receipt of notification via the hardware synchronization line h. The core c0 sets "counter" to "start", upon receiving notification from "post" (step S1604).

Upon completion of the process in step S1604 or when "counter" is equal to or greater than "start" (step S1602: No), the core c0 sets "role" to the identifier indicating "post" (step S1605). Upon completion of the process in step S1605, the core c0 shifts to the process in step S1406. The core c0 may execute the dependency loop by using either the CPU synchronization process or the memory synchronization process, whichever is faster, as the synchronization method, by executing the dependency-loop execution process.

As described above, according to the parallel operation system 100, the CPU synchronization process is executed when the processes executed by the cores provided in the different NUMA nodes execute the synchronization. Therefore, when the processes executed by the cores provided in the different NUMA nodes execute the synchronization, the parallel operation system 100 may improve the processing performance of the parallel operation system 100, as compared with a case where the memory synchronization process is performed.

In addition, according to the parallel operation system 100, the memory synchronization process is executed, when the processes executed by the cores provided in the same NUMA node execute the synchronization. Therefore, when the processes executed by the cores in the same NUMA node execute the synchronization, the parallel operation system 100 may improve the processing performance of the parallel operation system 100, as compared with a case where the CPU synchronization process is performed in most of cases.

Moreover, according to the parallel operation system 100, either one of the CPU synchronization process and the memory synchronization process may be decided to be executed based on the chunk size, by referring to the synchronization-method-specific performance information 510. Therefore, the parallel operation system 100 may decide to execute the memory synchronization process when the chunk size is large, and may decide to execute the CPU synchronization process when the chunk size is small.

Further, according to the parallel operation system 100, either one of the CPU synchronization process and the memory synchronization process may be decided to be executed based on the number of iterations, by referring to the synchronization-method-specific performance information 510. Therefore, the parallel operation system 100 may decide to execute the CPU synchronization process when the number of iterations is small, and may decide to execute the memory synchronization process when the number of iterations is large.

Assume that the first core and the second core included in the parallel operation system 100 execute the dependency loop. In addition, assume that either one of the first core and the second core satisfies the above-described decision criterion, specifically, for example, assume that the first core and the second core belong to the same NUMA node and execution of the CPU synchronization process is decided. In this case, since the first core and the second core belong to the same NUMA node, the other core of the first core and the second core may decide to execute the CPU synchronization process. Therefore, the decision result may not be transmitted to the other core.

A parallel operation method described in the embodiment may be implemented by causing a computer such as a personal computer and a workstation to execute a program prepared beforehand. A parallel operation program described in the embodiment is recorded in a computer readable recording medium such as a hard disk, a flexible disk, a compact disc-read only memory (CD-ROM), and a digital versatile disk (DVD), and read by the computer to be executed. In addition, the parallel operation program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel operation system comprising:
a first node including
a first processor configured to execute a first process,
a second processor configured to execute a second process, and
a first memory, and
a second node including
a third processor configured to execute a third process,
a fourth processor configured to execute a fourth process, and
a second memory, and
a first signal line that transfers synchronization information between at least one of the first and second processors and at least one of the third and fourth processors,
wherein
when the first process is to be synchronized with the third process, at least one of the first and the third processors uses the first signal line to execute a first synchronization process,
the first node further includes a second signal line that transfers synchronization information between the first processor and the second processor,
the at least one of the first and second processors is configured to:
when the first process and the second process is to be synchronized in the first node, compare a processing performance of a second synchronization process that synchronizes the first process and the second process by using the first memory, with a processing performance of a third synchronization process that synchronizes the first process and the second process by using the second signal line,
determine one of the second synchronization process and the third synchronization process is to be executed by the at least one of the first and second processors, based on the comparison, and
execute the determined one of the second synchronization process and the third synchronization process.

2. The system according to claim 1, wherein
the first synchronization process is a CPU synchronization process which performs synchronization between the first process and the third process using the first signal line.

3. The system according to claim 1, wherein
the performance of the second synchronization process is based on an access speed for the at least one of the first and second processors to access the first memory.

4. The system according to claim 1, wherein
the performance of the second synchronization process is based on a size of the first memory used for the second synchronization process.

5. The system according to claim 1, wherein
the first process repeats a first predetermined process,
the second process repeats a second predetermined process, and
the at least one of the first and second processors is configured to:
determine one of the third synchronization process and the second synchronization process, based on the comparison and the number of times the first process repeats the first predetermined process and the second process repeats the second predetermined process.

6. An apparatus comprising:
a memory; and
a first processor coupled to the memory and configured to:
   determine, when a second processor that executes a first process and a third processor that executes a second process belong to different nodes in a parallel operation system, to execute a first synchronization process to synchronize the first process and the second process using a signal line which couples the first processor and the second processor, the parallel operation system including a plurality of nodes including the different nodes,
   cause at least one of the second processor and the third processor to execute the first synchronization process based on the determination of executing the first synchronization process,
   when the first process and the second process is to be synchronized in a same node, compare a processing performance of a second synchronization process that synchronizes the first process and the second process by using the memory, with a processing performance of a third synchronization process that synchronizes the first process and the second process by using the signal line,
   determine one of the third synchronization process and the second synchronization process is to be executed by at least one of the second processor and the third processor, based on the comparison, and
   cause the at least one of the second processor and the third processor to execute the determined one of the third synchronization process and the second synchronization process.

7. The apparatus according to claim 6, wherein
the performance of the second synchronization process is based on an access speed for the at least one of the second processor and the third processor to access the memory.

8. The apparatus according to claim 6, wherein
the performance of the second synchronization process is based on a size of the memory used for the second synchronization process.

9. The apparatus according to claim 6, wherein
the first process repeats a first predetermined process,
the second process repeats a second predetermined process, and
the first processor is configured to:
   determine one of the third synchronization process and the second synchronization process, based on the comparison result and the number of times the first process repeats the first predetermined process and the second process repeats the second predetermined process.

10. The apparatus according to claim 6, wherein
the first processor is one of the second processor and the third processor.

11. A non-transitory computer readable medium having stored therein a program that causes a computer to execute:
   determining, when a first processor that executes a first process and a second processor that executes a second process belong to different nodes in a parallel operation system, to execute a first synchronization process to synchronize the first process and the second process using a signal line which couples the first processor and the second processor, the parallel operation system including a plurality of nodes including the different nodes;
   causing at least one of the first processor and the second processor to execute the first synchronization process based on the determination of executing the first synchronization process;
   when the first process and the second process is to be synchronized in the first node, comparing a processing performance of a second synchronization process that synchronizes the first process and the second process by using the first memory, with a processing performance of a third synchronization process that synchronizes the first process and the second process by using the second signal line;
   determining one of the third synchronization process and the second synchronization process is to be executed by at least one of the first processor and the second processor, based on the comparison; and
   causing the at least one of the first processor and the second processor to execute the determined one of the third synchronization process and the second synchronization process.

12. The non-transitory computer readable medium according to claim 11, wherein the performance of the second synchronization process is based on an access speed for the at least one of the first processor and the second processor to access the memory.

13. The non-transitory computer readable medium according to claim 11, wherein the performance of the second synchronization process is based on a size of the memory used for the second synchronization process.

14. The non-transitory computer readable medium according to claim 11, wherein
the first process repeats a first predetermined process,
the second process repeats a second predetermined process, and
the computer further executes:
   determining one of the third synchronization process and the second synchronization process, based on the comparison result and the number of times the first process repeats the first predetermined process and the second process repeats the second predetermined process.

* * * * *